US012637133B2

(12) United States Patent
Takasuga

(10) Patent No.: US 12,637,133 B2
(45) Date of Patent: May 26, 2026

(54) VEHICLE STEERING SYSTEM

(71) Applicant: TOYOTA JIDOSHA KABUSHIKI KAISHA, Toyota (JP)

(72) Inventor: Kazuki Takasuga, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/780,649

(22) Filed: Jul. 23, 2024

(65) Prior Publication Data

US 2025/0100617 A1     Mar. 27, 2025

(30) Foreign Application Priority Data

Sep. 26, 2023     (JP) ................................. 2023-162968

(51) Int. Cl.
| | |
|---|---|
| *B62D 7/09* | (2006.01) |
| *B62D 5/04* | (2006.01) |
| *B62D 6/00* | (2006.01) |
| *B62D 7/06* | (2006.01) |
| *B62D 9/00* | (2006.01) |

(52) U.S. Cl.
CPC .......... *B62D 5/0418* (2013.01); *B62D 6/002* (2013.01); *B62D 7/09* (2013.01); *B62D 5/0481* (2013.01); *B62D 7/06* (2013.01); *B62D 9/00* (2013.01)

(58) Field of Classification Search
None
See application file for complete search history.

(56) References Cited

U.S. PATENT DOCUMENTS

| | | | | |
|---|---|---|---|---|
| 6,015,193 | A * | 1/2000 | Vogel ..................... | B60T 8/321 |
| | | | | 303/140 |
| 6,991,061 | B2 * | 1/2006 | Laurent ................ | B62D 5/0418 |
| | | | | 180/402 |
| 8,010,254 | B2 * | 8/2011 | Chai ...................... | B62D 6/008 |
| | | | | 701/72 |
| 8,972,114 | B1 * | 3/2015 | Han ........................ | B62D 5/003 |
| | | | | 701/41 |
| 11,584,429 | B2 * | 2/2023 | Miura .................. | B62D 5/0493 |
| (Continued) | | | | |

FOREIGN PATENT DOCUMENTS

| | | | | |
|---|---|---|---|---|
| BE | 1031158 A1 * | 7/2024 | ........... | B62D 5/0484 |
| BE | 1031158 B1 * | 7/2024 | ........... | B62D 5/0484 |
| (Continued) | | | | |

*Primary Examiner* — Kevin R Steckbauer

(74) *Attorney, Agent, or Firm* — Sughrue Mion, PLLC

(57) ABSTRACT

A vehicle steering system mounted on a vehicle having a plurality of wheels that are steerable, including: a wheel steering device configured to steer the wheels independently of each other; and a controller configured to control the wheel steering device such that a steering amount of each wheel becomes equal to a target steering amount determined for each of the wheels based on a steering request, wherein, in a one-wheel improperly steered state in which one of the wheels is an improperly steered wheel that is improper in steering, the controller determines, as a steering compensation wheel, at least one of one or more of the wheels except the improperly steered wheel and changes the target steering amount of the steering compensation wheel so as to ensure, based on the steering request, a total sideways force that is a total of sideways forces to be generated respectively by the wheels.

2 Claims, 5 Drawing Sheets

(56) References Cited

U.S. PATENT DOCUMENTS

| | | | | |
|---|---|---|---|---|
| 12,227,240 | B2 * | 2/2025 | Yoo | B62D 6/002 |
| 2004/0140147 | A1 * | 7/2004 | Laurent | B62D 5/0418 180/402 |
| 2011/0190985 | A1 * | 8/2011 | Billberg | B60W 30/02 701/1 |
| 2015/0066304 | A1 * | 3/2015 | Han | B62D 5/003 701/43 |
| 2020/0102008 | A1 * | 4/2020 | Pasquet | B62D 5/003 |
| 2021/0016825 | A1 * | 1/2021 | Miura | B62D 6/003 |
| 2022/0332329 | A1 * | 10/2022 | Katsuyama | B60W 40/13 |
| 2023/0249743 | A1 * | 8/2023 | Yoo | B62D 6/002 701/41 |
| 2025/0100617 | A1 * | 3/2025 | Takasuga | B62D 5/0418 |

FOREIGN PATENT DOCUMENTS

| | | | | | |
|---|---|---|---|---|---|
| CN | 107454881 | A | * | 12/2017 | B62D 5/30 |
| CN | 208360287 | U | * | 1/2019 | |
| CN | 109606461 | A | * | 4/2019 | B62D 5/0484 |
| CN | 110228520 | A | * | 9/2019 | B62D 5/0481 |
| CN | 113799764 | A | * | 12/2021 | B62D 6/002 |
| CN | 113799764 | B | * | 8/2022 | B60W 30/045 |
| CN | 114954646 | A | * | 8/2022 | B62D 7/159 |
| CN | 116588184 | A | * | 8/2023 | B62D 6/00 |
| CN | 114954646 | B | * | 10/2023 | B62D 6/00 |
| CN | 119705608 | A | * | 3/2025 | B62D 6/002 |
| CN | 120390709 | A | * | 7/2025 | B62D 9/002 |
| CN | 116588184 | B | * | 12/2025 | B62D 15/021 |
| DE | 60315116 | T2 | * | 4/2008 | B62D 9/005 |
| DE | 102008000365 | A1 | * | 8/2009 | B62D 7/146 |
| DE | 102020100719 | A1 | * | 7/2021 | B62D 15/025 |
| DE | 102022109030 | A1 | * | 10/2022 | B60W 10/04 |
| DE | 102022204239 | A1 | * | 8/2023 | B62D 6/00 |
| EP | 1428740 | A1 | * | 6/2004 | B62D 5/003 |
| EP | 1428740 | B1 | * | 7/2007 | B62D 5/0418 |
| EP | 3778353 | A1 | * | 2/2021 | B62D 6/003 |
| EP | 4090574 | B1 | * | 10/2024 | B62D 15/025 |
| JP | 2004210263 | A | * | 7/2004 | B62D 5/003 |
| JP | 2007-307972 | A | | 11/2007 | |
| JP | WO2019188951 | A1 | * | 3/2021 | B62D 6/003 |
| JP | 2022165535 | A | * | 11/2022 | B60W 10/04 |
| JP | 7226433 | B2 | * | 2/2023 | B62D 5/0493 |
| JP | 2023532091 | A | * | 7/2023 | B62D 7/159 |
| JP | 2025053879 | A | * | 4/2025 | B62D 6/002 |
| KR | 20150028094 | A | * | 3/2015 | B62D 6/002 |
| KR | 101515708 | B1 | * | 5/2015 | B62D 5/003 |
| WO | WO-2019188951 | A1 | * | 10/2019 | B62D 6/003 |
| WO | WO-2021144184 | A1 | * | 7/2021 | B62D 15/025 |
| WO | WO-2024133152 | A1 | * | 6/2024 | B62D 9/002 |

* cited by examiner

FIG.5

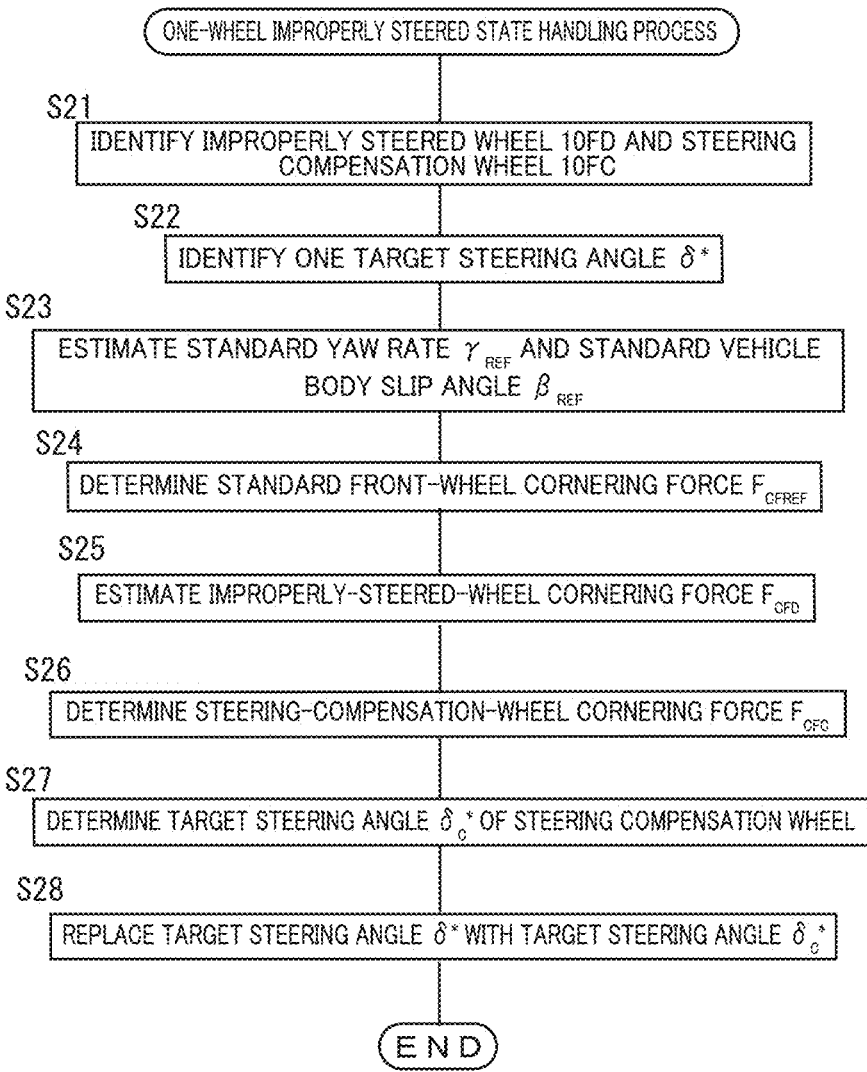

ONE-WHEEL IMPROPERLY STEERED STATE HANDLING PROCESS

S21 IDENTIFY IMPROPERLY STEERED WHEEL 10FD AND STEERING COMPENSATION WHEEL 10FC

S22 IDENTIFY ONE TARGET STEERING ANGLE $\delta^*$

S23 ESTIMATE STANDARD YAW RATE $\gamma_{REF}$ AND STANDARD VEHICLE BODY SLIP ANGLE $\beta_{REF}$

S24 DETERMINE STANDARD FRONT-WHEEL CORNERING FORCE $F_{CFREF}$

S25 ESTIMATE IMPROPERLY-STEERED-WHEEL CORNERING FORCE $F_{CFD}$

S26 DETERMINE STEERING-COMPENSATION-WHEEL CORNERING FORCE $F_{CFC}$

S27 DETERMINE TARGET STEERING ANGLE $\delta_c^*$ OF STEERING COMPENSATION WHEEL

S28 REPLACE TARGET STEERING ANGLE $\delta^*$ WITH TARGET STEERING ANGLE $\delta_c^*$

END

VEHICLE STEERING SYSTEM

REFERENCE TO RELATED APPLICATIONS

This application claims priority from Japanese Patent Application No. 2023-162968 filed on Sep. 26, 2023. The entire content of the priority application is incorporated herein by reference.

TECHNICAL FIELD

The following disclosure relates to a steering system mounted on a vehicle.

BACKGROUND ART

Regarding control of a vehicle having a plurality of actuators, there is a technique described in Japanese Patent Application Publication No. 2022-165535 (JP 2022-165535A), for example. In this technique, tire three component forces are calculated by calculation of quadratic programming using an active-set method based on six component forces of the center of gravity, and a vehicle is controlled by a plurality of actuators based on the tire three component forces.

SUMMARY

Recently, for example, a vehicle in which a plurality of wheels are steered independently of each other by a plurality of actuators has been developed. The technology described in the above patent publication can also be applied to this vehicle. On the other hand, for example, a situation is also expected in which one of the plurality of wheels cannot be appropriately steered due to a failure of one of the plurality of actuators or the like. However, it is difficult to cope with such a situation with the above technology. Therefore, if it is possible to cope with such a situation, it is possible to improve the practicality of the vehicle steering system mounted on a vehicle in which a plurality of wheels can be steered independently of each other (hereinafter, also referred to as a "multi-wheel independent steering vehicle"). The present disclosure has been made in view of such circumstances, and an object thereof is to provide a vehicle steering system with high practicality.

In one aspect of the present disclosure, a vehicle steering system mounted on a vehicle having a plurality of wheels that are steerable includes: a wheel steering device configured to steer the plurality of wheels independently of each other; and a controller configured to control the wheel steering device such that a steering amount of each of the plurality of wheels becomes equal to a target steering amount determined for each of the plurality of wheels based on a steering request. In a one-wheel improperly steered state in which one of the plurality of wheels is an improperly steered wheel that is improper in steering, the controller determines, as a steering compensation wheel, at least one of one or more of the plurality of wheels except the improperly steered wheel and changes the target steering amount of the steering compensation wheel so as to ensure, based on the steering request, a total sideways force that is a total of sideways forces to be generated respectively by the plurality of wheels.

According to the vehicle steering system of the present disclosure, the total sideways force based on the steering request is ensured by changing the target steering amount for the steering compensation wheel in the one-wheel improperly steered state. As a result, the vehicle can turn or corner properly even in the one-wheel improperly steered state.
Various Forms The "steering amount" in the vehicle steering system (hereinafter, simply referred to as "steering system" where appropriate) of the present disclosure means a steering angle (turning angle, toe angle) of a wheel, an operation amount of a steering member that operates in accordance with steering of the wheel, and the like. The "wheel steering device" may, for example, be a device with a steering actuator provided for each wheel. The steering system of the present disclosure may be a so-called steer-by-wire steering system. The "steering request" is a concept indicating to which extent the vehicle is caused to turn regardless of whether the vehicle is automatically driven or the vehicle is driven by a driver. In the vehicle driven by the driver, for example, the steering request can be considered to be indicated by an operation amount of a steering operation member (for example, an operation angle of a steering wheel).

The "controller" of the present steering system may include a computer, a drive circuit (driver) of a drive source of the wheel steering device, and the like. The controller controls the wheel steering device such that the steering amount of each of the plurality of wheels becomes equal to the target steering amount determined for each of the plurality of wheels based on the steering request. That is, the controller executes the steering control. Specifically, the steering control is, for example, control in which the target steering amount of each wheel is determined based on the steering request, a steering force (for example, a steering torque) to be applied to the wheel is determined based on a deviation of an actual steering amount of each wheel from the target steering amount, and a current corresponding to the steering force is supplied to an electric motor when the wheel steering device includes the electric motor as a drive source.

The improperly steered wheel, which is improper in steering, means, for example, a wheel in which a difference between the target steering amount and the actual steering amount is excessive, a wheel to which the steering force cannot be applied, a wheel to which the steering force is insufficiently or excessively applied, or the like. In a case where the wheel steering device includes an electric motor as a drive source, a state in which a current is not supplied to the electric motor or an actual supply current deviates from a current to be supplied, due to a malfunction, a failure, or the like of a drive circuit of the electric motor corresponds to the one-wheel improperly steered state.

The process for handling the one-wheel improperly steered state can be referred to as a one-wheel improperly steered state handling process (hereinafter, simply referred to as "handling process" in some cases). The handling process in the present steering system is a process of changing the target steering amount of the wheel that is not the improperly steered wheel in order to ensure the total sideways force corresponding to the steering request, based on the steering request. Specifically, for example, in a case where the sideway force to be generated by the improperly steered wheel is insufficient, the target steering amount of the steering compensation wheel is changed in order to compensate for the insufficiency by generating an extra sideway force in the steering compensation wheel. If the total sideways force can be properly ensured, the vehicle can be properly turned or cornered. The term "sideways force" as used herein means a general lateral force generated by the wheel, and is a concept including a cornering force, a lateral force, and the like. In the present steering system, either the cornering force or the lateral force may be adopted as the sideways force.

The number of steerable wheels and the number of steering compensation wheels in the vehicle on which the present steering system is mounted are not particularly limited to a specific number. Specifically, the number of steerable wheels may be two or more, and the number of steering compensation wheels may be one or more. For example, in a vehicle having four wheels, i.e., left and right front wheels and left and right rear wheels, when the four wheels are steerable wheels, two or more wheels can be the steering compensation wheels. In this case, compensation for the total sideways force may be appropriately distributed to two or more of the steering compensation wheels. As an example of a specific aspect, in a case where the vehicle has four wheels (i.e., left and right front wheels and left and right rear wheels) and the plurality of wheels that are steerable are the left and right front wheels, when one of the left and right front wheels is the improperly steered wheel in the one-wheel improperly steered state, the controller may change the target steering amount of the other of the left and right front wheels that is the steering compensation wheel.

As for a specific processing mode of the handling process, the controller may be configured to estimate an improper sideways force, which is the sideways force being generated by the improperly steered wheel, and change the target steering amount of the steering compensation wheel based on the estimated improper sideways force, in the one-wheel improperly steered state. The estimation of the improper sideways force may be based on the actual steering amount of the improperly steered wheel or may be based on the steering force being applied to the improperly steered wheel. In the former case, there is a possibility that the improper sideways force cannot be accurately estimated due to a steering delay of the improperly steered wheel or the like. On the other hand, in the latter case, it is possible to perform estimation in consideration of a steering delay of the improperly steered wheel. When the drive source for steering the wheel is an electric motor, the steering force applied to the improperly steered wheel may be estimated from a supply current supplied to the electric motor.

BRIEF DESCRIPTION OF DRAWINGS

The objects, features, advantages, and technical and industrial significance of the present disclosure will be better understood by reading the following detailed description of an embodiment, when considered in connection with the accompanying drawings, in which:

FIG. 5 is a flowchart of a one-wheel improperly steered state handling process subroutine that constitutes the target steering angle determining process program.

DESCRIPTION

Hereinafter, as a mode for carrying out the present disclosure, a vehicle steering system according to an embodiment of the present disclosure will be described in detail with reference to the drawings. It is to be understood that the present disclosure is not limited to the following embodiment, but may be embodied with various changes and modifications, such as those described in the foregoing "Various Forms", which may occur to those skilled in the art.

[A] Configuration of Vehicle Steering System

Figure 1:
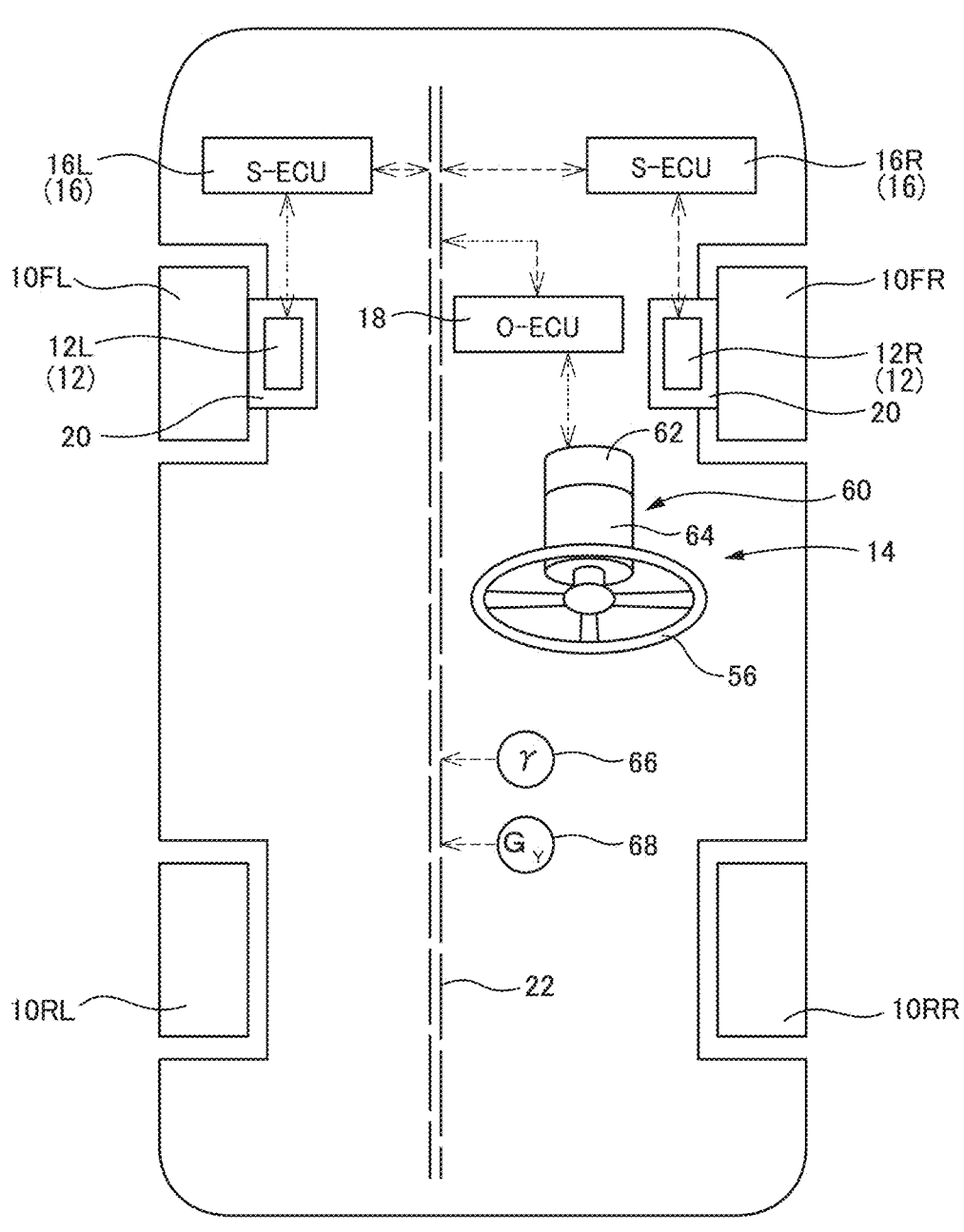
FIG. 1 is a diagram conceptually illustrating an overall configuration of a vehicle steering system according to one embodiment of the present disclosure.

The vehicle steering system (hereinafter, simply referred to as a "steering system" in some cases) of the embodiment is a so-called steer-by-wire steering system. As schematically shown in FIG. 1, the present steering system is mounted on a vehicle having left and right front wheels 10FL, 10FR and left and right rear wheels 10RL, 10RR. The left and right front wheels 10FL and 10FR are steerable wheels, and the left and right rear wheels 10RL and 10RR are non-steerable wheels. A wheel steering device 12 that steers the left and right front wheels 10FL and 10FR includes a left-wheel steering device 12L that steers the left front wheel 10FL and a right-wheel steering device 12R that steers the right front wheel 10FR. The steering system further includes an operation device 14 for receiving an operation of a driver, a pair of steering electronic control units (hereinafter, sometimes abbreviated as "steering ECUs") 16L and 16R for controlling the left-wheel steering device 12L and the right-wheel steering device 12R, respectively, and an operation electronic control unit (hereinafter, sometimes abbreviated as "operation ECU") 18 for controlling the operation device 14 and centrally controlling the pair of steering ECUs 16.

In the following description, when the left and right front wheels 10FL and 10FR do not need to be distinguished from each other, each of them may be collectively referred to as a front wheel 10F, and when the left and right rear wheels 10RL and 10RR do not need to be distinguished from each other, each of them may be collectively referred to as a rear wheel 10R. When the front wheel 10F and the rear wheel 10R do not need to be distinguished from each other, each of them may be collectively referred to as a wheel 10. Although the wheel steering device 12 includes the left-wheel steering device 12L and the right-wheel steering device 12R, when it is not necessary to distinguish the left-wheel steering device 12L and the right-wheel steering device 12R from each other, the left-wheel steering device 12L and the right-wheel steering device 12R may be collectively referred to as the wheel steering device 12. Similarly, when it is not necessary to distinguish the pair of steering ECUs 16L and 16R from each other, each of the steering ECUs 16L and 16R is referred to as the steering ECU 16. Further, various parameters for the left and right front wheels 10FL and 10FR, which will be described later, may be collectively referred to by omitting L and R in the reference numerals when it is not necessary to distinguish the left and right.

Each of the wheel steering devices 12 is incorporated into a wheel mounting module 20 which will be described in more detail below. The pair of steering ECUs 16 and the operation ECU 18 are each connected to a CAN (car area network or controllable area network) 22, and can communicate with each other via the CAN 22. In the steering system, it can be considered that the controller that controls one wheel steering device 12 including the left-wheel steering device 12L and the right-wheel steering device 12R is configured by the pair of steering ECUs 16, the operation ECU 18, and the CAN 22.

Figure 2:
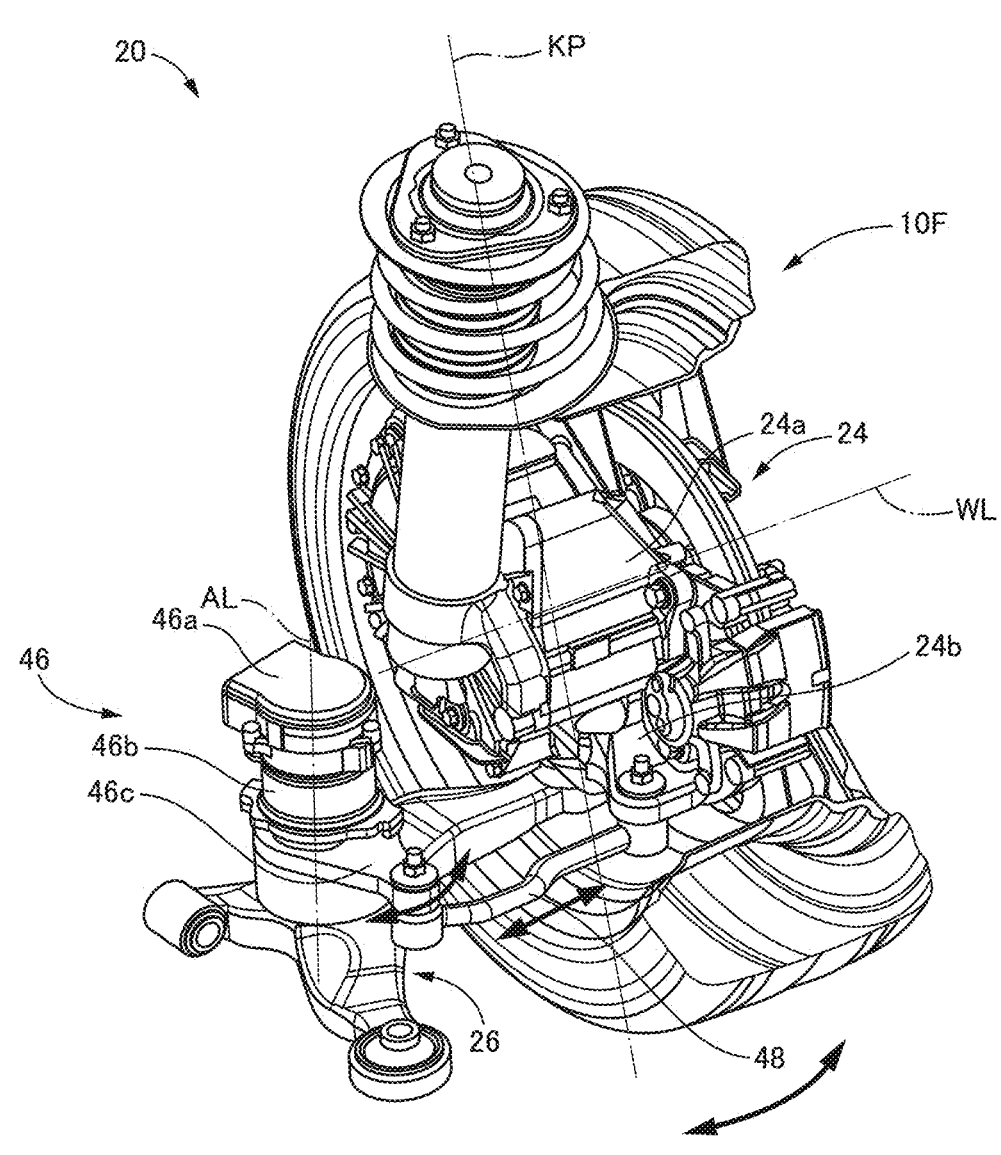
FIG. 2 is a perspective view illustrating a wheel mounting module disposed in a vehicle equipped with the vehicle steering system of the embodiment.

The wheel mounting module (hereinafter sometimes simply referred to as "module") 20 includes a McPherson suspension device as illustrated in FIG. 2, and is a module for mounting the front wheel 10F on the vehicle body. FIG. 2 shows a module 20 for the left front wheel 10FL. The module 20 includes a wheel drive unit 24 (so-called "in-wheel motor") as a wheel rotation drive device. A housing 24a of the wheel drive unit 24 holds the front wheel 10F rotatably about a wheel axis WL and also functions as a steering knuckle in the wheel steering device 12. Hereinafter, the housing 24a may be referred to as a knuckle 24a.

The module 20 includes the wheel steering device 12 (either the left-wheel steering device 12L or the right-wheel steering device 12R) described above. The wheel steering device 12 is a single-wheel independent steering device for steering one of the left and right front wheels 10F independently of the other. The wheel steering device 12 generally includes the knuckle 24a described above, a steering actuator 46 disposed on a lower arm 26 at a position close to a base end portion of the lower arm 26, and a tie rod 48 connecting the steering actuator 46 and the knuckle 24a.

The steering actuator 46 includes a steering motor 46a which is an electric motor as a drive source, a decelerator 46b which decelerates rotation of the steering motor 46a, and an actuator arm 46c which is rotated by the rotation of the steering motor 46a via the decelerator 46b and functions as a pitman arm. A proximal end portion of the tie rod 48 is coupled to the actuator arm 46c, and a distal end portion of the tie rod 48 is coupled to the knuckle arm 24b.

In the wheel steering device 12, when the steering motor 46a is operated, the actuator arm 46c of the steering actuator 46 rotates about an actuator axis AL as indicated by a thick arrow in the drawing. The rotation is transmitted by the tie rod 48, and the knuckle 24a is rotated about a kingpin axis KP.

The operation device 14 has a general structure in a steer-by-wire steering system. Briefly, as illustrated in FIG. 1, the operation device 14 includes a steering wheel 56 as a steering operation member operated by the driver and a reaction force application device 60 that applies an operation reaction force to the steering wheel 56. The reaction force application device 60 includes a reaction force motor 62, which is an electric motor as a power source, and a decelerator 64 for transmitting the force of the reaction force motor 62 to the steering wheel 56.

Each steering ECU 16 includes a computer having a CPU, a ROM, a RAM, and the like, and a driver (drive circuit) of the steering motor 46a. The operation ECU 18 includes a computer having a CPU, a ROM, a RAM, and the like, and a driver (drive circuit) of the reaction force motor 62. The steering motor 46a and the reaction force motor 62 are three-phase brushless DC motors, and the drivers of the steering ECU 16 and the operation ECU 18 are inverters.

A steering motor rotation angle $\delta_M$, which is a motor rotation angle (rotational phase) of the steering motor 46a, and a steering angle $\delta$, which is a steering amount from a neutral position of the wheel 10 (i.e., a position at which the wheel 10 should be positioned when the vehicle is traveling straight ahead), are in a specific reduction ratio relationship.

The steering ECUs 16L and 16R have a function of detecting steering angles $\delta_L$ and $\delta_R$ of the left front wheel 10FL and the right front wheel 10FR, respectively, based on motor rotation angles $\delta_{MR}$ and $\delta_{ML}$ of the corresponding steering motors 46a. Similarly, a reaction force motor rotation angle $\theta_M$, which is a motor rotation angle (rotational phase) of the reaction force motor 62, and an operation angle $\theta$, which is an amount of operation of the steering wheel 56 from a neutral position (i.e., a position at which the steering wheel 56 should be positioned when the vehicle is traveling straight ahead), have a specific reduction ratio relationship, and the operation ECU 18 has a function of detecting the operation angle $\theta$ of the steering wheel 56 based on the motor rotation angle $\theta_M$ of the reaction force motor 62.

[B] Wheel Steering Control in Vehicle Steering System

In the present steering system, in order to steer the left and right front wheels 10FL and 10FR, the operation ECU 18 and the pair of steering ECUs 16 execute a target steering angle determining process and a single-wheel steering process, respectively. In short, the target steering angle determining process is a process of determining target steering angles $\delta_L{}^*$ and $\delta_R{}^*$, which are targets of the steering angles $\delta_L$ and $\delta_R$ of the left and right front wheels 10FL and 10FR, respectively, in accordance with the steering request of the driver. The single-wheel steering process is a process of operating the steering motor 46a such that the steering angle $\delta$ of one front wheel 10F becomes equal to the target steering angle $\delta^*$. Hereinafter, the target steering angle determining process and the single-wheel steering process will be described in detail, and a handling process when the left front wheel 10FL or the right front wheel 10FR becomes improper will be described. The operation ECU 18 executes an operation reaction force control that causes the reaction force application device 60 to apply an operation reaction force to the steering wheel 56 in order to give an appropriate steering operation feeling to the driver, but a description of this control will be omitted.

(a) Target Steering Angle Determining Process

Figure 3:
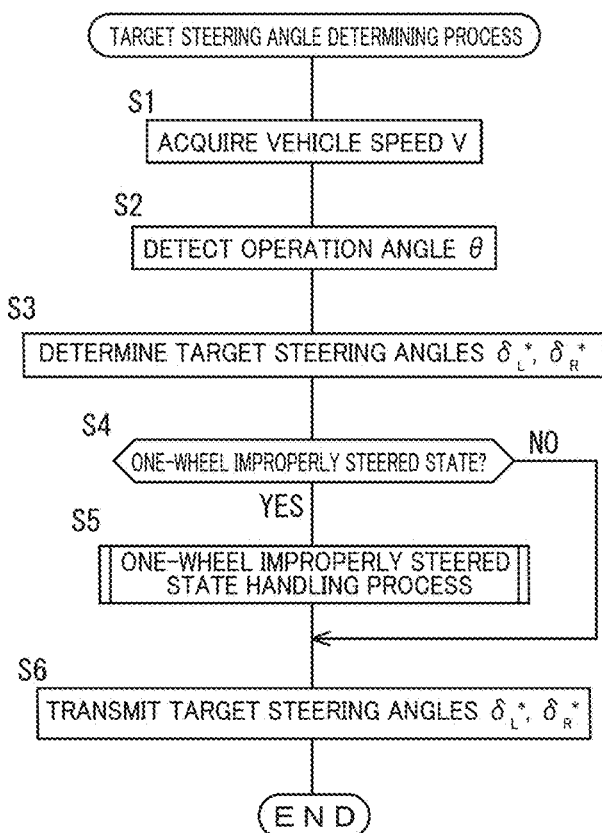
FIG. 3 illustrates a flowchart of a target steering angle determining process program and a flow chart of a single-wheel steering process program executed in the vehicle steering system of the embodiment.
Figure 3:
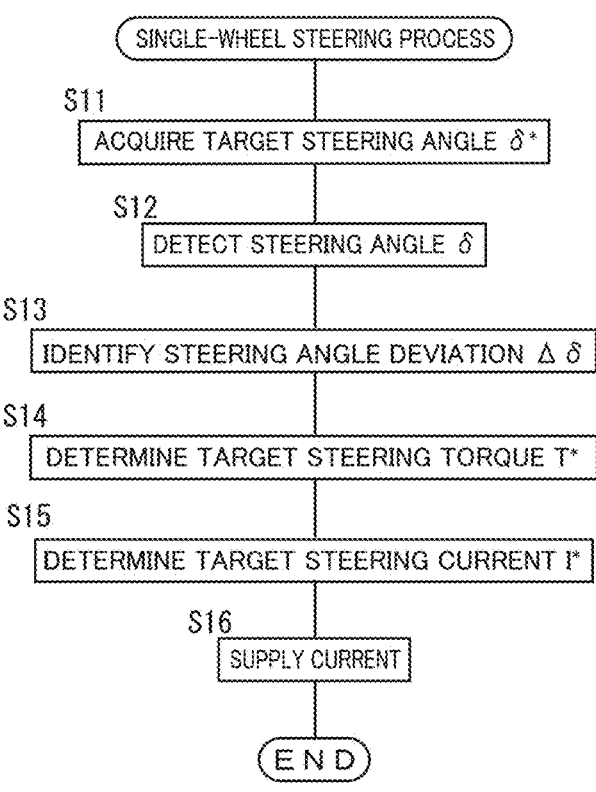

The target steering angle determining process is performed by the operation ECU 18 repeatedly executing the target steering angle determining process program shown in the flowchart of FIG. 3 at a short time pitch (for example, several to several tens of microseconds). The target steering angle determining process will be explained referring to the flowchart. In the target steering angle determining process, step 1 (hereinafter abbreviated as "S1" and the same applies to the other step) is initially performed. In S1, a traveling speed V of the vehicle (hereinafter referred to as "vehicle speed" where appropriate) is acquired from a brake system (not shown) of the vehicle via the CAN 22. The vehicle speed V is detected based on a rotation speed $V_W$ of each wheel 10. Next, in S2, the operation angle $\theta$ of the steering wheel 56 is detected based on the motor rotation angle $\theta_M$ of the reaction force motor 62.

Figure 4A:
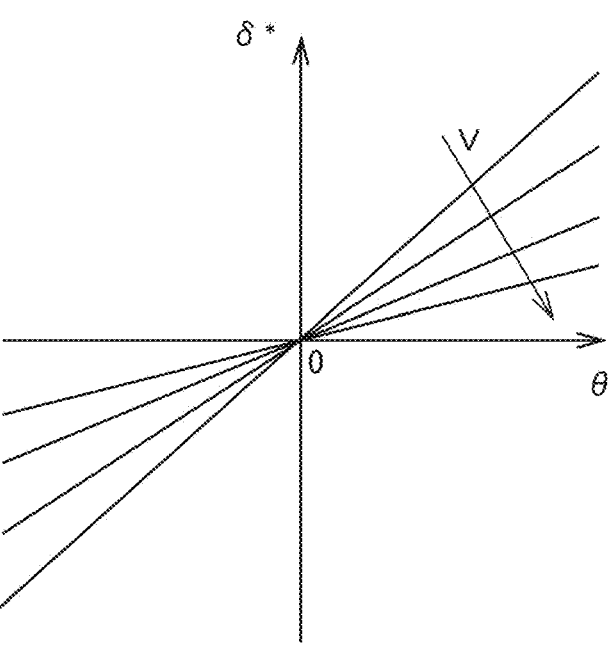
FIG. 4A is a schematic diagram illustrating a target steering angle determination map referred to in the target steering angle determining process.

Subsequently, in S3, the target steering angles $\delta_L{}^*$ and $\delta_R{}^*$ of the left and right front wheels 10FL and 10FR are determined based on the operation angle $\theta$. More specifically, the present steering system is a vehicle speed sensitive steering system, and the target steering angles $\delta_L{}^*$ and $\delta_R{}^*$ are reduced as the vehicle speed V increases even at the same operation angle $\theta$. Specifically, the target steering angles $\delta_L{}^*$ and $\delta_R{}^*$ are determined with reference to a target steering angle determination map as schematically shown in FIG. 4A.

Then, in S4, it is determined whether or not any one of the left and right front wheels 10FL, 10FR is in a state of not being properly steered, that is, in the one-wheel improperly steered state. In other words, it is determined whether or not any one of the left and right front wheels 10FL, 10FR is the improperly steered wheel that is improper in steering. In the case of the one-wheel improperly steered state, the one-wheel improperly steered state handling process is executed in S5. The one-wheel improperly steered state and the one-wheel improperly steered state handling process will be described in detail later.

The target steering angles $\delta_L*$ and $\delta_R*$ determined in S3 or changed in S5 are transmitted to the steering ECUs 16L and 16R via the CAN 22 in S6. After the transmission, one execution of the program is terminated.

(b) Single-Wheel Steering Process

The single-wheel steering process is performed by each of the steering ECUs 16L and 16R that correspond to the left and right front wheels 10FL and 10FR repeatedly executing the single-wheel steering process program illustrated in the flowchart of FIG. 3 at a short time pitch (for example, several to several tens of usec). The single-wheel steering process will be explained referring to the drawings. In the single-wheel steering process performed by each steering ECU 16, initially, in S11, the target steering angle $\delta*$ is acquired from the operation ECU 18 via the CAN 22. Subsequently, in S12, the actual steering angle $\delta$ of the front wheel 10F is detected, and in S13, a steering angle deviation $\Delta\delta(=\delta*-\delta)$, which is a deviation of the steering angle $\delta$ from the target steering angle $\delta*$, is identified.

Next, in S14, a target steering torque T*, which is a steering torque T required to steer the front wheel 10F, is determined according to the following equation. The steering torque T is a kind of the steering force and is a torque around the kingpin axis KP. In the following equation, the target steering torque T* is determined according to the PID control law based on the steering angle deviation $\Delta\delta$. Incidentally, $G_P$, $G_I$, and $G_D$ in the following expression are a proportional term gain, an integral term gain, and a derivative term gain, respectively.

$$T^* = G_P\Delta\delta + G_I \int \Delta\delta dt + G_D \frac{d\Delta\delta}{dt} \qquad (1)$$

The steering torque T can be considered to be approximately proportional to a steering current I, which is a current supplied to the steering motor 46a. Accordingly, in S15, a target steering current I*, which is a target of the steering current I, is determined by multiplying the determined target steering torque T* by a steering current determining coefficient $K_I$. Then, in S16, a current is supplied to the steering motor 46a based on the target steering current I*, and one execution of the program is terminated.

(c) Handling One-Wheel Improperly Steered State

It should be assumed that one of the pair of front wheels 10F cannot be appropriately steered due to some cause such as a failure of a drive circuit of the steering motor 46a. In the present steering system, in the one-wheel improperly steered state in which one of the pair of front wheels 10F is the improperly steered wheel, the other front wheel 10F is set as the steering compensation wheel, and the target steering angle $\delta*$ of the front wheel 10F is changed to cope with the state.

Whether the vehicle is in the one-wheel improperly steered state is determined in S4 of the target steering angle determining process as described above. As a premise, the steering ECU 16 corresponding to the front wheel 10F determines that the front wheel 10F in question has become the improperly steered wheel. In short, when a state in which a difference between the target steering angle $\delta*$ of the corresponding front wheel 10 and the steering angle $\delta$ that is actually detected is larger than a threshold difference continues to some extent, or when a state in which a difference between the target steering current I* and the current I that is actually supplied is larger than a threshold difference continues to some extent, the front wheel 10F is determined to be the improperly steered wheel. When the front wheel 10 is recognized as the improperly steered wheel, the steering ECU 16 that has recognized the improperly steered wheel transmits the recognition to the operation ECU 18. Based on the result of the recognition, the operation ECU 18 recognizes that the steering system is in the one-wheel improperly steered state.

As described above, in the one-wheel improperly steered state, the one-wheel improperly steered state handling process (hereinafter, sometimes referred to as "handling process") is performed in S5 of the target steering angle determining process. The handling process is performed by the operation ECU 18 executing a handling process subroutine shown in the flowchart of FIG. 5. Before describing the process according to this subroutine, a general theory regarding steering of the wheel 10 will be described.

Figures 4B, 4C:
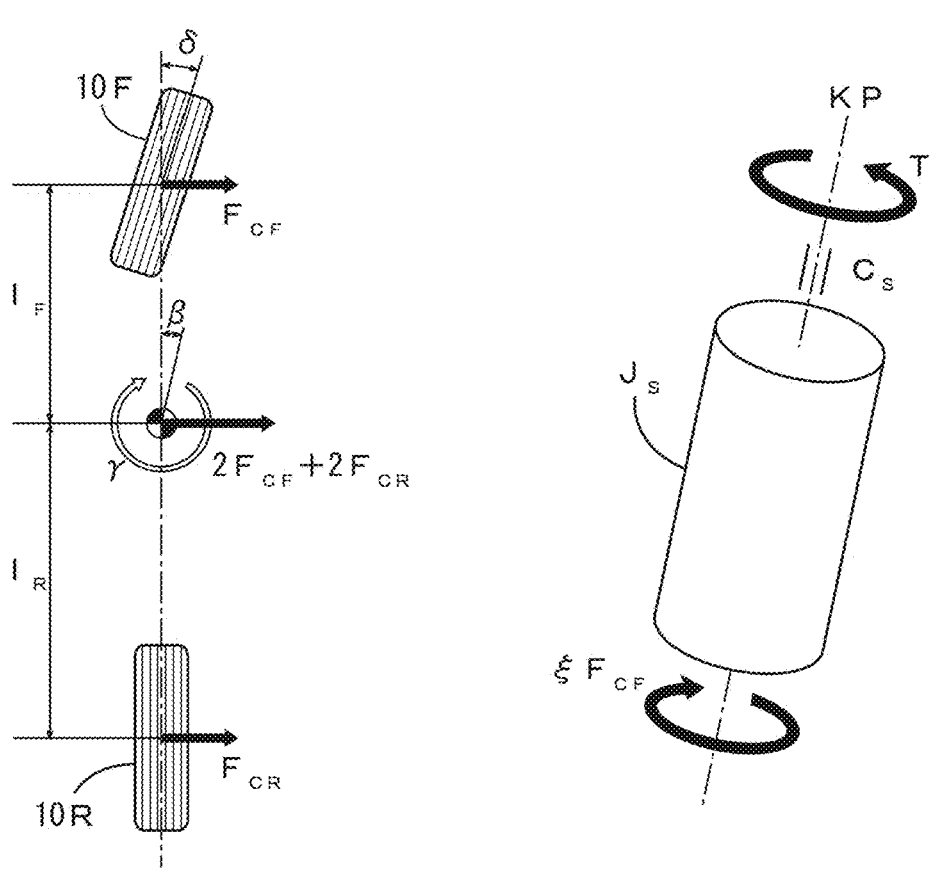
FIG. 4B is a schematic diagram illustrating a two-wheel model of a steering system referred to in the target steering angle determining process.
FIG. 4C is a schematic diagram illustrating a wheel steering motion model referred to in the target steering angle determining process.

Describing with reference to a two-wheel model shown in FIG. 4B, in a vehicle in which only the front wheel 10F can be steered, a front-wheel cornering force $F_{CF}$ and a rear-wheel cornering force $F_{CR}$ as shown in the following equations are generated in one front wheel 10F and one rear wheel 10R, respectively, in accordance with the steering of the front wheel 10F. Incidentally, in the following expressions, $\beta$ is a vehicle body slip angle (vehicle slip angle), $\gamma$ is a yaw rate of the vehicle, $I_F$ is a distance in the longitudinal direction between an axle line of the front wheel 10F and the center of gravity of the vehicle body (hereinafter, simply referred to as a "distance between the center of gravity and the front wheel" in some cases), $I_R$ is a distance in the longitudinal direction between an axle line of the rear wheel 10R and the center of gravity of the vehicle body (hereinafter, simply referred to as a "distance between the center of gravity and the rear wheel" in some cases), $K_F$ is a front wheel cornering stiffness, and $K_R$ is a rear wheel cornering stiffness. The front-wheel cornering force $F_{CF}$ is one kind of the sideway force generated by one front wheel 10F, and the rear-wheel cornering force $F_{CR}$ is one kind of the sideways force generated by one rear wheel 10R.

$$F_{CF} = K_F\left(\beta + \frac{1_F}{V}\gamma - \delta\right) \qquad (2)$$

$$F_{CR} = K_R\left(\beta - \frac{1_R}{V}\gamma\right) \qquad (3)$$

Considering the entire vehicle, the following equation is established. Incidentally, m is the weight of the vehicle (hereinafter, sometimes referred to as "vehicle weight").

$$mV\left(\frac{d\beta}{dt} + \gamma\right) = 2F_{CF} + 2F_{CR} \qquad (4)$$

9

10

In the above equation, the right side can be expressed by the following equation using lateral acceleration $G_Y$ of the vehicle.

$$mV\left(\frac{d\beta}{dt} + \gamma\right) = mG_Y \tag{5}$$

On the other hand, the following two basic equations also hold for turning of the four-wheeled vehicle in which only the front wheels 10F are steered. J is the moment of inertia about the vertical axis of the vehicle.

$$mV\frac{d\beta}{dt} + 2(K_F + K_R)\beta + \left\{mV + \frac{2}{V}(1_F K_F - 1_R K_R)\right\}\gamma = 2K_F\delta \tag{6}$$

$$2(1_F K_F - 1_R K_R)\beta + J\frac{d\gamma}{dt} + \frac{2\left(1_{F2} K_F + 1_{R2} K_R\right)}{V}\gamma = 21_F K_F\delta \tag{7}$$

In the processing according to the handling process subroutine, initially, in S21, it is identified which one of the left and right front wheels 10FL, 10FR is the improperly steered wheel, and the other wheel that is not the improperly steered wheel is identified as the steering compensation wheel. In the following description, the improperly steered wheel may be referred to as 10FD, and the steering compensation wheel may be referred to as 10FC. In addition, the steering angle and the target steering angle of the improperly steered wheel 10FD may be referred to as $\delta_D$ and $\delta_D^*$, respectively, and the steering angle and the target steering angle of the steering compensation wheel 10FC may be referred to as $\delta_C$ and $\delta_C^*$, respectively.

Next, in S22, the target steering angles $\delta_L^*$ and $\delta_R^*$ of the left and right front wheels 10FL and 10FR determined in S3 are identified, and one target steering angle $\delta^*$ is identified by, for example, obtaining an average on the assumption that the target steering angles $\delta_L^*$ and $\delta_R^*$ are equal to each other. Then, in S23, the two equations (6) and (7) are regarded as simultaneous equations and solved based on the target steering angle $\delta^*$, thereby estimating a standard yaw rate $\gamma_{REF}$ and a standard vehicle body slip angle $\beta_{REF}$ in the case where it is assumed that neither of the left and right front wheels 10FL and 10FR is the improperly steered wheel 10FD. Next, in S24, based on the standard yaw rate $\gamma_{REF}$, the standard vehicle body slip angle $\beta_{REF}$, and the target steering angle $\delta^*$, a standard front-wheel cornering force $F_{CFREF}$, which is the cornering force $F_{CF}$ to be generated by each of the left and right front wheels 10FL and 10FR, is determined according to the above equation (2). Incidentally, a value obtained by doubling the standard front-wheel cornering force $F_{CFREF}$ is the cornering force to be generated by the entire front wheels 10F, that is, a total standard front-wheel cornering force as the total sideways force.

In subsequent S25, the cornering force actually generated by the improperly steered wheel 10FD, that is, an improperly-steered-wheel cornering force $F_{CFD}$ as an improper sideways force, is estimated. Two methods are conceivable as a method of this estimation, and either method may be adopted in S25. Two methods will be described below.

The first method is a method of estimating the improperly-steered-wheel cornering force $F_{CFD}$ based on an actual yaw rate $\gamma$, an actual vehicle body slip angle $\beta$, and an actual steering angle $\delta_D$ of the improperly steered wheel 10FD. Specifically, it is a method according to the above equation (2). The actual steering angle $\delta_D$ is detected based on the steering motor rotation angle $\delta_M$. As illustrated in FIG. 1, the vehicle is provided with a yaw rate sensor 66 and a lateral acceleration sensor 68, and the actual yaw rate $\gamma$ is detected based on a detection value of the yaw rate sensor 66. Since a change rate of the vehicle body slip angle $\beta$ can be estimated according to the above equation (5) based on the actual yaw rate $\gamma$ and the actual lateral acceleration $G_Y$ detected based on the detection value of the lateral acceleration sensor 68, the actual vehicle body slip angle $\beta$ is estimated based on the estimated change rate of the vehicle body slip angle $\beta$.

The second method is a method of performing the estimation according to the following equation (8). The following equation (8) is a state equation based on a wheel turning motion model of FIG. 4C. In the following equation, $J_S$ represents the moment of inertia about the kingpin axis of the wheel 10, $C_S$ represents the damping coefficient in the steering motion, and $\xi$ represents the pneumatic trail.

$$Js\frac{d^2\delta}{dt^2} + Cs\frac{d\delta}{dt} = T - \xi F_{CF} \tag{8}$$

The steering torque T, which is the steering force, can be identified from the steering current I actually supplied to the steering motor 46a. That is, it can be said that the method according to the above equation is a method of estimating the improperly-steered-wheel cornering force $F_{CFD}$ from a change in the steering angle $\delta_D$ of the improperly steered wheel 10 and the steering current I actually supplied. The second method is to estimate the improperly-steered-wheel cornering force $F_{CFD}$ by estimating a change in the steering angle $\delta$ of the improperly steered wheel 10FD slightly ahead. According to this method, it is possible to perform estimation without delay, in other words, estimation in consideration of a steering delay.

After the estimation of the improperly-steered-wheel cornering force $F_{CFD}$, a steering-compensation-wheel cornering force $F_{CFC}$, which is the cornering force to be generated by the steering compensation wheel 10FC, is determined in S26. Specifically, the steering-compensation-wheel cornering force $F_{CFC}$ is determined by subtracting the improperly-steered-wheel cornering force $F_{CFD}$ from the cornering force to be generated by the entire front wheels 10F, that is, twice the standard front-wheel cornering force $F_{CFREF}$, that is, the total standard front-wheel cornering force.

In subsequent S27, the target steering angle $\delta_C^*$ of the steering compensation wheel 10FC is determined according to the above equation (2) based on the steering-compensation-wheel cornering force $F_{CFC}$. In this instance, the actual yaw rate $\gamma$ and the actual vehicle body slip angle $\beta$ are used. Then, in S28, the target steering angle $\delta^*$ of one of the left front wheel 10FL and the right front wheel 10FR that is set as the steering compensation wheel 10FC is replaced from the value determined in S3 to the value determined as the target steering angle $\delta_C^*$ of the steering compensation wheel 10FC.

By changing the target steering angle $\delta^*$ for the steering compensation wheel 10FC in the one-wheel improperly steered state by the handling process described above, the cornering force to be generated by the front wheels 10F as a whole based on the steering request is ensured. As a result, the vehicle can turn or corner properly even in the one-wheel improperly steered state.

What is claimed is:

1. A vehicle steering system mounted on a vehicle having a plurality of wheels that are steerable, comprising:

a wheel steering device configured to steer the plurality of wheels independently of each other; and a controller configured to control the wheel steering device such that a steering amount of each of the plurality of wheels becomes equal to a target steering amount determined for each of the plurality of wheels based on a steering request, wherein, in a one-wheel improperly steered state in which one of the plurality of wheels is an improperly steered wheel, the controller determines, as a steering compensation wheel, at least one of the plurality of wheels except the improperly steered wheel, and changes the target steering amount of the steering compensation wheel so as to ensure a total sideways force that corresponds to the steering request, the total sideways force being a total of sideways forces to be generated respectively by the plurality of wheels, wherein, in the one-wheel improperly steered state, the controller estimates an improper sideways force, which is the sideways force being generated by the improperly steered wheel, and changes the target steering amount of the steering compensation wheel based on the estimated improper sideways force, and estimates the improper sideways force based on a steering force being applied to the improperly steered wheel.

2. The vehicle steering system according to claim 1, wherein the vehicle has four wheel including right and left front wheels and right and left rear wheels, and the plurality of wheels that are steerable are the right and left front wheels, and wherein, when one of the right and left front wheels is the improperly steered wheel in the one-wheel improperly steered state, the controller changes the target steering amount of the other of the right and left front wheels that is the steering compensation wheel.

* * * * *